July 17, 1934.  H. A. KNOX  1,966,450
TRACK FOR TRACKLAYING VEHICLES
Filed Feb. 6, 1933
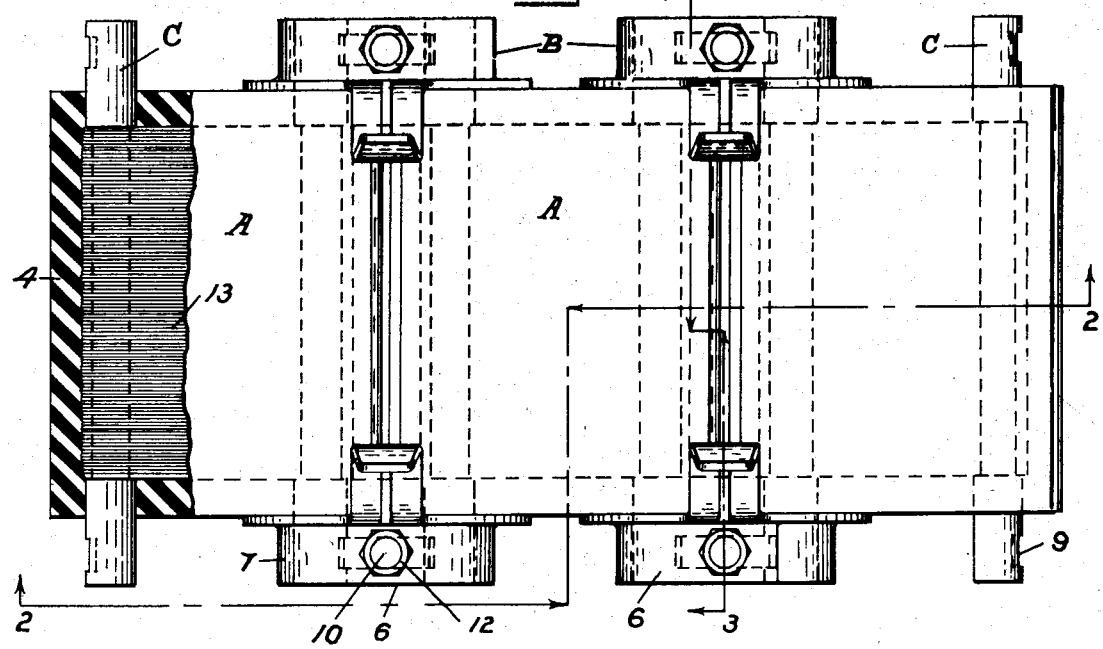
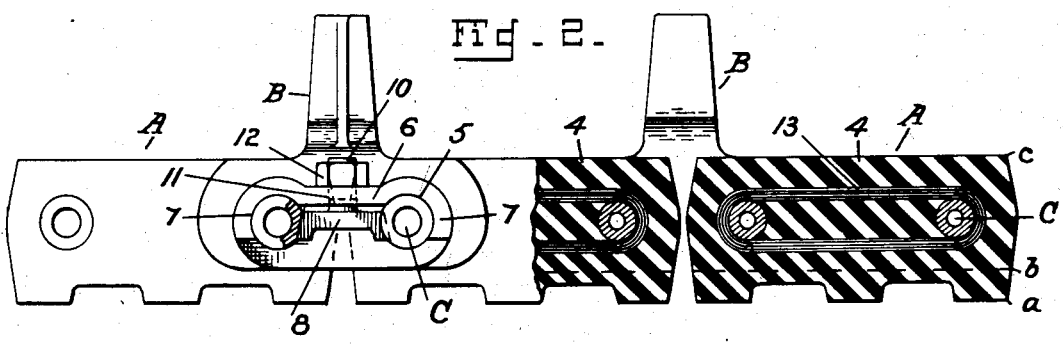
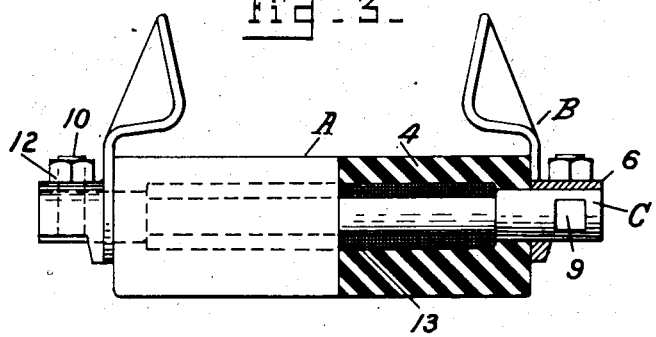
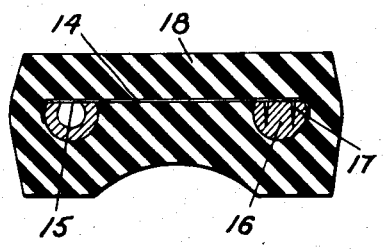
Inventor
Harry A. Knox
W. N. Roach
Attorney Patented July 17, 1934

1,966,450

UNITED STATES PATENT OFFICE 1,966,450

TRACK FOR TRACK-LAYING VEHICLES

Harry A. Knox, Davenport, Iowa

Application February 6, 1933, Serial No. 655,443

2 Claims. (Cl. 305—10)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a track for track-laying vehicles.

The purpose of this invention is to provide a track which is conveniently formed of sections in the manner of a jointed link track but which operates in flection in the manner of a jointless band track. The track is composed of a series of rubber blocks whose inner sides constitute a rail for the supporting wheels of the vehicle and whose outer sides are adapted to engage the ground.

A novel reinforcement is embedded in the blocks which are laterally confined by the connecting links.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view partly in section of a portion of the lower flight of an endless track constructed in accordance with the invention.

Fig. 2 is a view partly in side elevation and partly in section taken on the line 2—2 of Fig. 1.

Fig. 3 is a sectional view on the line 3—3 of the line 3—3 of Fig. 1.

Fig. 4 is a longitudinal sectional view through a modified form of block, and

Fig. 5 is a longitudinal sectional view of another modified form of block.

The track comprises a series of shoes A connected in spaced relation by links B mounted on the link pins C.

The shoes are all identical and each consists of a block 4 of resilient material such as rubber capable of bending sufficiently to enable an endless track formed of the blocks to be trained about the wheels of a vehicle. The inner sides of the blocks form a rail for the wheels of the vehicle while the outer sides are adapted to provide a traction surface for engaging the ground. The outer portion of the block designated by a—b is preferably of harder and tougher rubber than the remaining portion b—c which is intended to afford flexibility.

The link pins C extend laterally through each block adjacent its ends and project sufficiently to accommodate the links B. Each link B has a pair of apertures 5—5 for receiving the projecting ends of the adjoining link pins C of adjoining shoes A.

On the outer side of each link is a laterally projecting flange 6 which preferably has turned ends 7—7 to hook over the link pins. A bolt insertable between the link pins has a wedge-shaped head 8 receivable in slots 9 in the link pins. The shank 10 of the bolt passes through an aperture 11 in the flange 6 and a nut 12 is applied thereto until it bears against the flange. This connection holds the links in place and locks the associated link pins against independent rotational movement. The turned ends 7 also constitute driving lugs for taking the drive from a sprocket wheel. As clearly seen in Figs. 1 and 2 the links B laterally support and confine the resilient material of the blocks except at the center thereof. The upper edge of the link is preferably in the plane of the under side of the rubber block to prevent the margin of the block from overlapping the edge of the link.

The rubber blocks 4 are preferably reinforced. As shown in Fig. 2 the reinforcement consists of cords 13 trained about the pair of link pins C of each shoe. In forming the shoe A the cords are positioned on the link pins C which are held in spaced relation in any suitable manner. The rubber block is then applied by molding or electro-deposition so that the pins, cord and rubber are vulcanized together and a unitary structure is formed in which the pins are not rotatable in the block.

In Fig. 4 the cords 13a are alternately crossed.

In Fig. 5 the reinforcement consists of one or more spring steel plates 14 resting on the flattened surface 15 of a pair of link pins 16—16 and secured thereto by means of pins 17. The rubber block 18 is then applied as in the case of Fig. 2.

I claim:

1. In a track for track-laying vehicles, a series of spaced shoes, each shoe consisting of a rubber block, a pair of link pins extending laterally through and fixed in opposite ends of each block, said pins projecting beyond the sides of the block, links connecting adjoining pins of adjoining shoes, said links laterally confining said block, and means for locking the pins against independent rotational movement in the links.

2. In a track for track-laying vehicles, a series of spaced shoes, each shoe consisting of a rubber block, a pair of link pins extending laterally through and fixed in opposite ends of each block, said pins projecting beyond the sides of the block, and links rigidly connecting adjoining pins of adjoining shoes.

HARRY A. KNOX.